Figure 1:
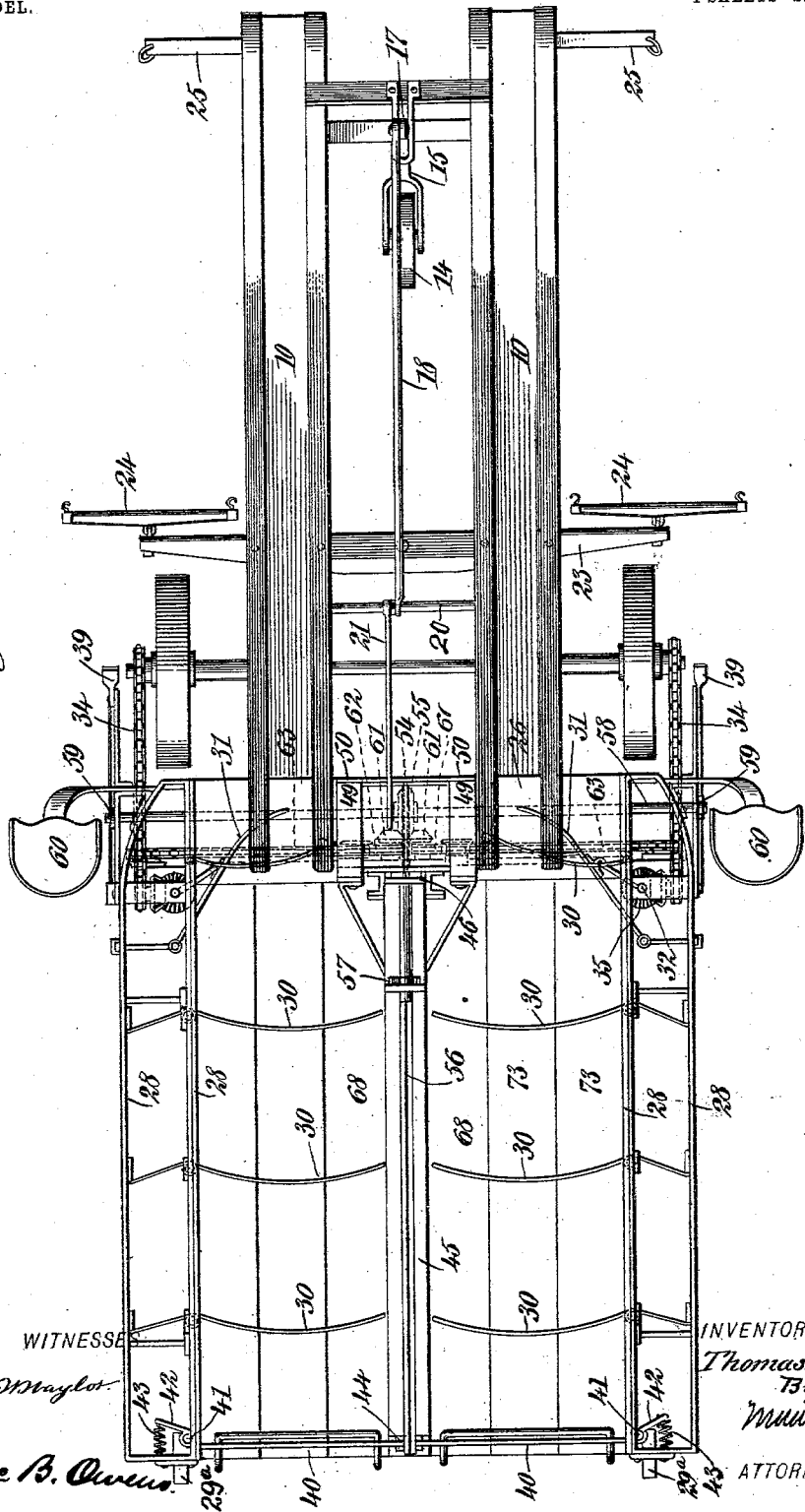

No. 748,932. PATENTED JAN. 5, 1904.
T. L. CREATH.
CORN SHOCKER.
APPLICATION FILED JUNE 11, 1903.
NO MODEL. 4 SHEETS—SHEET 1.

WITNESSES
INVENTOR
Thomas L. Creath
By
ATTORNEYS.

No. 748,932. PATENTED JAN. 5, 1904.
T. L. CREATH.
CORN SHOCKER.
APPLICATION FILED JUNE 11, 1903.
NO MODEL. 4 SHEETS—SHEET 2.
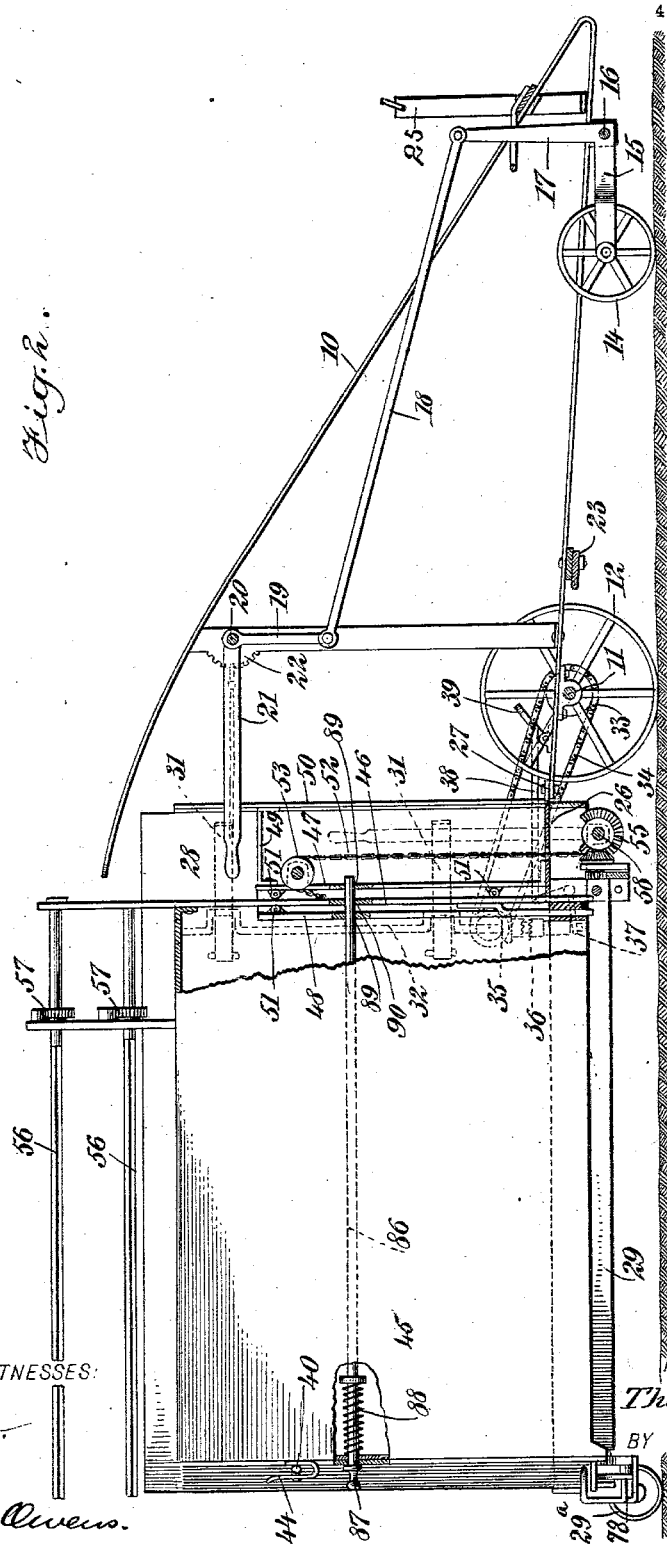
WITNESSES:
Geo. W. Taylor.
Isaac B. Owens.
INVENTOR
Thomas L. Creath
BY
Munn
ATTORNEYS.

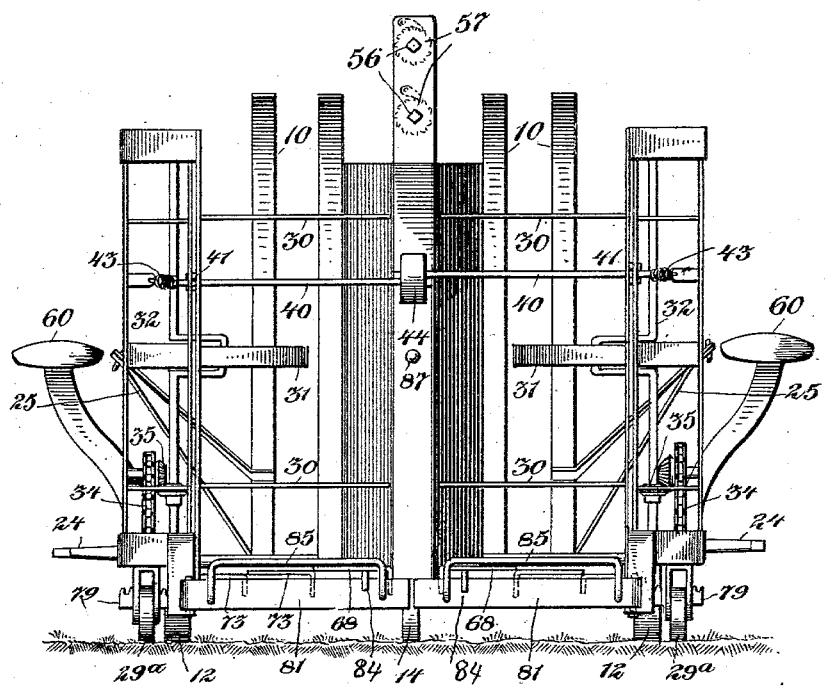

No. 748,932. PATENTED JAN. 5, 1904.
T. L. CREATH.
CORN SHOCKER.
APPLICATION FILED JUNE 11, 1903.
NO MODEL. 4 SHEETS—SHEET 4.
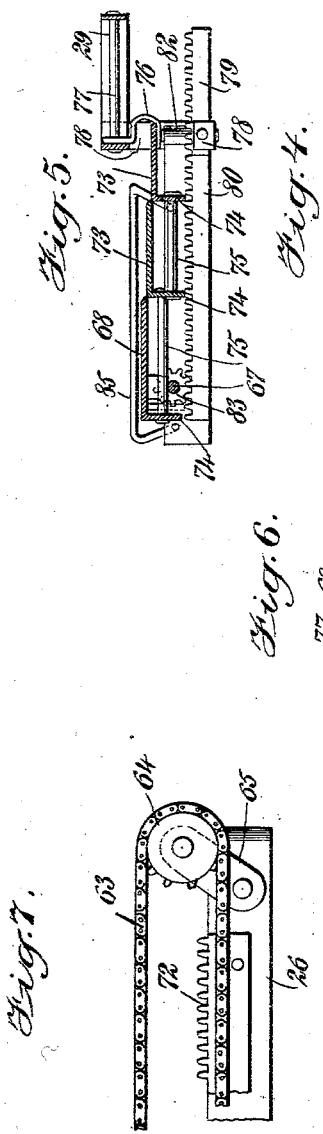
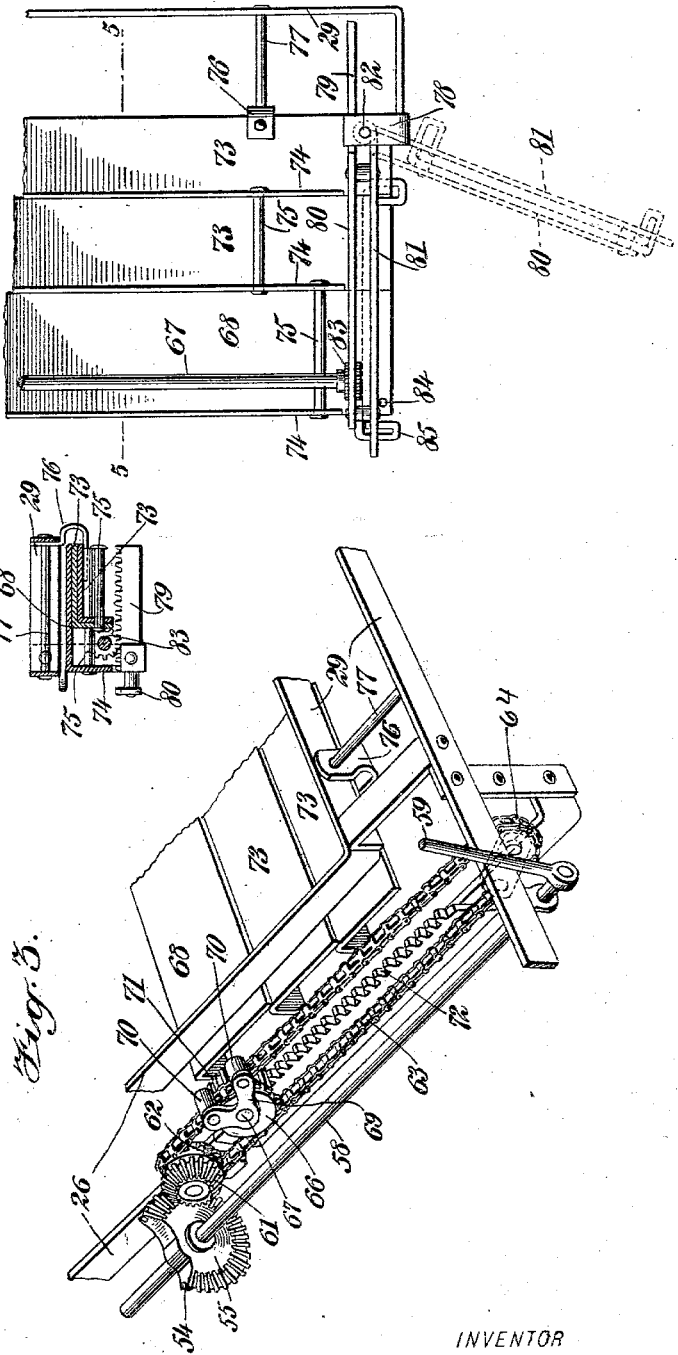
WITNESSES:
INVENTOR
Thomas L. Creath
BY
ATTORNEYS.

No. 748,932. Patented January 5, 1904.

UNITED STATES PATENT OFFICE.

THOMAS L. CREATH, OF MOUNT STERLING, OHIO.

CORN-SHOCKER.

SPECIFICATION forming part of Letters Patent No. 748,932, dated January 5, 1904.

Application filed June 11, 1903. Serial No. 161,009. (No model.)

*To all whom it may concern:*

Be it known that I, THOMAS L. CREATH, a citizen of the United States, and a resident of Mount Sterling, in the county of Madison and State of Ohio, have invented a new and Improved Corn-Shocker, of which the following is a full, clear, and exact description.

This invention relates to an apparatus intended principally for forming shocks of corn and depositing the shocks in upright position in the field, the apparatus being attached directly to the harvester by which the corn is cut.

The invention also relates to a novel arrangement of the harvester-frame, the draft apparatus being rearward of the front end of the harvester and the horses walking one at each side thereof.

The apparatus may also be used in connection with other grain.

In carrying out the present invention I provide a wheeled shocker-frame with a horizonal shocker platform or floor made up of one or more slats arranged to slide horizontally, so as to open or close the platform, and means for operating the slat or slats at the will of the attendant. According to the structure here shown the platform is divided into two longitudinal sections, each having a plurality of slats and the slats of each section being arranged to slide toward the respective sides, the slats nesting one under the other when the platform is in folded position, and in the middle of the platform is arranged a division-wall which carries devices for assisting in the operation of tying or binding the shock and which is arranged to drop simultaneously with the opening movement of the platform, so that as the platform opens and the middle wall drops the shocker is free to move ahead out of engagement with the shock, leaving the latter standing in the field. I also form an intermediate connection between the harvester-frame and the shocker-frame, the harvester and its frame being arranged to enable two rows of corn to be cut simultaneously, the frame having two longitudinal guideways through which the corn is led to the respective sides of the middle wall of the shocker. The frame is provided with draft devices for the team, these devices being at the rear portion of the frame and at each side thereof, so that the horses walk between the first and second and third and fourth rows of corn while the apparatus is cutting the second and third rows.

The invention involves various other features of major or minor importance, and all will be fully set forth hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a central longitudinal section of the apparatus, illustrating the middle wall with parts broken away at the front end. Fig. 2ᵃ is a rear elevation of the machine. Fig. 3 is a fragmentary perspective view showing one side of the dumping-platform and the means for operating the same. Fig. 4 is an inverted plan view of the outer end portion of one side of the platform. Fig. 5 is a section on the line 5 5 of Fig. 4. Fig. 6 is a section of one part of the platform in folded position, and Fig. 7 is a detail view of the slat-operating means.

I have not illustrated nor will I describe the details of the harvester cutting and conveying mechanisms, since they form no part of the present invention.

10 indicates the guideways of the harvester-frame, through which the two rows of corn as they are cut are passed. These guideways 10 have bottoms, as illustrated in Fig. 1.

11 indicates the rear axle, having the wheels 12, and 14 indicates a centrally-located front wheel, which is located between the guideways 10 and is mounted on a fork 15, pivoted at the point 16 and connected with the principal arm 17. (See Fig. 2.) From the arm 17 a link 18 extends rearward to an arm 19 on a shaft 20. To said shaft is also attached a hand-lever 21, having pawl and quadrant devices 22, as indicated. By these means the front of the harvester-frame may be raised or lowered at will, thus regulating the height of the cut.

Attached to the harvester-frame, at the rear thereof, is a doubletree 23, which passes under the bottom of the guideways 10, the ends of which carry, respectively, the swingletrees 24, these devices 23 and 24 constituting the draft apparatus and the swingletrees lying one at each side of the harvester-frame, at the rear portion thereof, so that the horses will work at the sides of the frame as contradistinguished from in front thereof. The universal practice of planting corn in parallel rows enables this to be done without in any way destroying the crop or hampering the operation of the machine. Brackets 25 are projected transversely from the front portion of the harvester-frame, to which brackets the breast straps or chains of the horses are connected, so that the horses will be held properly, the brackets also serving to guide the machine and turn it at the end of the field.

The specific construction of the shocker-frame is not essential. As here shown it consists of a transversely-extending front beam 26, formed of sheet-metal sections suitably clamped together and joined securely to the rear portions of the harvester-frame, as indicated at 27. From the ends of this front beam 26 extend rearward the double side walls 28, which are suitably sustained on the rigid side beams 29. (See Figs. 3, 4, 5, and 6.) These side beams 29 are also illustrated as formed of metal sections riveted and bolted together. The said front beam 26 and side beams 29 form the base of the shocker-framing, this being open at the rear to permit the disengagement of the shocker from the shock, as will be hereinafter fully set forth. 29$^a$ indicates wheels which carry the rear end of the frame.

30 indicates a number of spring-sustained arms which extend rearwardly across the shocker-platform from each side thereof, and 31 indicates the packer-arms, these parts being arranged essentially the same as shown and described in my copending application for corn-shockers, filed March 8, 1902, Serial No. 97,248. The packer-shafts 32 are driven from the axle 11 by means of a sprocket 33, chain 34, and bevel-gears 35. With the bevel-gears coact suitable clutch mechanism 36, by which the packer-shaft may be thrown into and out of action. The clutches 36 are operated by elbow-levers 37, connected with links 38, which extend forward to treadles 39. At the rear of the platform are two pressure-bars 40, which are arranged normally to extend across the rear of the shocker-platform to hold the shock in place, said bars being pivoted, as indicated at 41, and having arms 42 projected beyond the pivots. To said arms are connected springs 43, which hold the arms 40 yieldingly in place. The arms are locked positively by a hook 44, fastened to the central or middle wall 45, so that when said wall is elevated, as shown in Fig. 2, the pressure-bars are held in place; but when the wall is dropped the pressure of the shock causes the pressure-bars to give way, and the shock is then free to move away from the platform, after which the pressure-bars return by the operation of the springs 43.

The central wall 45 has at its front edge and forming a part of the framing thereof a vertically-extending runner 46, which extends between two vertical guide-bars 47 and 48, which rise from the front beam 26 and are braced by rearwardly-extending brackets 49, projecting from vertical braces 50, extending from the front edge of the front beam 26. To the guide-bars 47 and 48 antifriction-rollers 51 are attached, these rollers engaging the runner 46 to hold the same in its vertical movement. Attached to the runner 46 is a chain 52, which passes over a guide-sheave 53, carried by the bar 47. From the said sheave 53 the chain 52 passes downward and is laid in a centrally-disposed peripheral groove 54 in a double-faced bevel-gear 55, the further functions of which will be hereinafter fully set forth.

86 indicates a lock-rod which is mounted in the middle wall 45 and has at its rear end a handle 87. 88 indicates a spring serving to press this rod yieldingly into forward position. Said rod is arranged to project through openings 89 in the guide-bars 47 and 48 and an opening 90 in the runner 46, thereby locking the wall 45 in raised position. By manually withdrawing said rod from the openings 89 and 90 the wall 45 will be free to drop. The chain 52 is attached to the gear 55, and when the gear is turned back and forth the middle wall 45 is raised or allowed to drop by gravity. The raised position of said wall is illustrated in Fig. 2.

56 indicates tie-rods, which are essentially the same in construction and operation as those disclosed in my before-referred-to pending application, and 57 indicates pawl-and-ratchet devices for preventing back movement of the rods during the tying operation.

The gear 55 is attached to a transverse shaft 58, which extends under the front beam 26 and has at each end a vertically-projecting hand-lever 59, facilitating the operation of the shaft from either side of the machine. At each side of the machine a seat 60 is arranged, so that the operator may sit at one side or the other, as desired. The double-faced bevel-gear 55 meshes with two bevel-pinions 61, which are suitably mounted to turn freely on the front beam 26 and which have sprocket-wheels 62 attached, respectively, thereto. Over said wheels 62 run chains 63, which extend to the respective sides of the machine and pass around idler sprocket-wheels 64, mounted on suitable belt-tighteners 65, arranged at the outer ends of the front beam 26. Meshed with each run of each chain 63 is a sprocket-wheel 66. These wheels 66 are attached, respectively, to shafts 67, which extend longitudinally of the machine and are mounted to turn in the respective inner slats 68 of the two sections of the dumping-platform. To the shafts 67 are loosely attached spiders 69, which carry rollers 70, bearing on the top runs of the respective chains, so as to hold them properly meshed with the sprocket-wheels 66. Therefore upon the movement of the chains 63 rotary movement will be imparted to the wheels 66 and shafts 67. Pinions 71 are also attached to the shaft 67 directly adjacent to the wheels 66, and said pinions 71 are in mesh with racks 72, fastened to the front beam 26 and located one at each side of the gear 55. By these devices 71 and 72 rotation of the shafts 67 will cause said shafts to move bodily laterally of the machine toward and from the center thereof. Each of the two sections of the dumping-platform have in addition to the inner slats 68 one or more outer slats 73. As best shown in Figs. 5 and 6, all of these slats have downwardly-extending flanges 74 at their inner edges, and the slats are arranged to slide one over the other. (See Fig. 6.) The slats are connected with each other to limit their inward or closing movement by means of tie-rods 75, which are fastened to one flange and slide in the adjacent flange. This construction is therefore capable of assuming the nested or open position (shown in Fig. 6) or the closed or extended position. (Shown in Fig. 5.) The two outermost slats 73 are limited in their closing movement, and the rear section of the platform is limited in its outward or opening movement by means of brackets 76, which are attached to the outer slats 73 and extend upward, said brackets sliding freely on transverse rods 77, attached to and forming parts of the side beams 29.

Projecting downward from the rear of each side beam 29 is a bracket 78. These brackets are turned forward at their lower ends and carry rigidly rack-sections 79, which extend transversely of the machine. These rack-sections 79 form continuations of racks 80, which are attached rigidly to swinging bars 81, pivoted to the brackets 78, as indicated at 82. When the bars 81 are in the position shown by full lines in Figs. 4 and 5—that is to say, extending transversely of the machine—the racks 79 and 80 are in alinement, forming a continuous rack, and with said continuous racks mesh pinions 83, fastened to the rear ends of the shafts 67. Therefore when the shafts 67 turn the pinions 83 roll along the racks 80 and 79 and coact with the pinions 71 and racks 72, before described. Each of the inner slats 68 is provided at its rear end with a downwardly-projecting stud 84, these studs engaging the rear faces of the bars 81 and serving when the platform is in closed position to hold the bars securely against the rearward movement. When, however, the platform is in folded or open position, the pins 84 assume a position outward from the pivot 82, and then the bars 81 are free to swing rearward, as indicated by the broken lines in Fig. 4. Said bars are each provided with an upwardly and forwardly curved guide 85, which overhangs the rear ends of the two sections of the platform when the platform is closed and will serve to hold the slats securely in their proper relation to the parts 80 and 81.

In the operation of the apparatus it is drawn through the field in the usual manner, and as the two rows of corn are cut they are led through the guideways 10 onto the dumping-platform at each side of the middle wall 45. The packer-arms 31 feed the corn rearward, and as it fills the platform the spring-arms 30 give way to allow the passage of the corn, as will be understood. When sufficient corn has been gathered between the walls 28 and 45, the operation of the machine is for the time arrested, the shock is tied, as will be fully understood from my prior application, and then the hand-levers 59 are operated to open the dumping-platform and to drop the middle wall 45. This movement releases the barriers 40 and also the bars 81. The shock is thereupon deposited on the ground, and upon again starting the operation of the harvester the shock will be left upright in the field.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a shocker, the combination of a frame, a centrally-situated wall movable vertically toward and from the ground, said wall extending longitudinally of the machine, a slat at each side of the wall, said slats extending longitudinally and being movable in a horizontal plane toward and from the middle wall, the slats constituting a dumping-platform, and means for operating the platform and wall in unison.

2. In a shocker, the combination of a frame, a plurality of slats slidable in parallel planes into extended or folded position one over the other, said slats constituting a dumping-platform, and means for operating said slats.

3. A dumping-platform for shockers, comprising a plurality of slats arranged to slide in parallel planes into extended or nested position, each slat having a flange at one edge, and connections between the flanges to limit the sliding movement of the slats.

4. In a shocker, the combination of a frame, a sliding slat mounted thereon for the purpose specified, a shaft mounted to rotate on the slat, a rack stationary with respect to the slat, a pinion attached to the shaft and meshed with the rack, and means for operating the shaft, said means for operating the shaft comprising a driven chain and a sprocket-wheel attached to the shaft and meshed with the chain.

5. In a shocker, the combination of a frame, a sliding slat mounted thereon for the purpose specified, a shaft mounted to rotate on the slat, a rack stationary with respect to the slat, a pinion attached to the shaft and meshed with the rack, means for operating the shaft, said means for operating the shaft comprising a driven chain and a sprocket-wheel attached to the shaft and meshed with the chain, a spider loosely mounted on the shaft, and a guide-roller carried by the spider and engaged by the chain, to hold it in mesh with the spider.

6. In a shocker, the combination of a frame, a sliding slat mounted thereon for the purpose specified, a shaft mounted to rotate on the slat, a rack stationary with respect to the slat, a pinion attached to the shaft and meshed with the rack, and means for operating the shaft, said means comprising a sprocket-wheel attached to the shaft, an endless sprocket-chain, the runs of which are in mesh with opposite sides of the sprocket-wheel, and devices for mounting and driving the sprocket-chain.

7. In a shocker, the combination of a frame, a sliding slat mounted thereon for the purpose specified, a shaft mounted to rotate on the slat, a rack stationary with respect to the slat, a pinion attached to the shaft and meshed with the rack, means for operating the shaft, said means comprising a sprocket-wheel attached to the shaft, an endless sprocket-chain the runs of which are in mesh with opposite sides of the sprocket-wheel, devices for mounting and driving the sprocket-chain, a spider loosely mounted on the shaft, and rollers attached to the spider and bearing on one run of the chain at opposite sides of the sprocket-wheel to hold the chain engaged with the wheel.

8. In a shocker, the combination of a frame, a dumping-platform comprising two sections mounted to move toward and from each other into open or closed position, operating devices for each section, said devices comprising a beveled pinion for each section, said pinions lying adjacent to each other, a double-faced bevel-gear lying between the pinions and having its faces respectively meshed with the pinions, a shaft on which the double-faced gear is carried, and means for operating the shaft.

9. The combination of a frame, a rack, means for mounting the rack to swing, a dumping-platform comprising a shiftable member, means for operating the dumping-platform, a driven pinion mounted on said shiftable member and adapted to mesh with the rack, and a guide-stud attached to the shiftable member to hold the rack in place during the engagement of the pinion therewith.

10. A shocker, comprising a frame, a member mounted to swing thereon, a rack carried by said member, a dumping-platform, a driven pinion mounted on the platform and adapted to mesh with the rack when the rack is in active position, and means for holding the rack in such position during the engagement of the pinion therewith.

11. In a shocker, the combination with the frame, of a member mounted to swing thereon, a rack carried by said member, a plurality of sliding slats constituting a dumping-platform, means for operating said slats, a driven pinion mounted on one slat and adapted to mesh with the rack, and a pin attached to said pinion-carrying slat and engaged with the swinging member to hold it in operative position during the engagement of the pinion with the rack.

12. In a shocker, the combination with the frame, of a member mounted to swing thereon, a rack carried by said member, a plurality of sliding slats constituting a dumping-platform, means for operating said slats, a driven pinion mounted on one slat and adapted to mesh with the rack, a pin attached to said pinion-carrying slat and engaged with the swinging member to hold it in operative position during the engagement of the pinion with the rack, and a guard attached to the swinging member and extending upward over the slats.

13. In a shocker, the combination of a frame, a plurality of slats forming a dumping-platform and being mounted to move into extended position or to fold or nest one alongside of the other, and means for operating said slats to move from one position to another.

14. The combination of a harvester-frame, a shocker mechanism attached to the rear end thereof, a draft apparatus at each side of the harvester-frame rearward of the front end thereof, said draft apparatus permitting a horse to walk at each side of the harvester-frame, a centrally-located front wheel supporting the front portion of the harvester-frame, and means for adjusting the relative position of the wheel and frame, for the purpose specified.

In testimony whereof I have signed my name to this specification in the presence of two subscribing witnesses.

THOMAS L. CREATH.

Witnesses:
DAVID B. SAINT,
HENRY L. COOK.